United States Patent Office 3,062,781
Patented Nov. 6, 1962

3,062,781
PROCESS FOR THE PRODUCTION OF POLYCARBONATES
Ludwig Bottenbruch and Gerhard Fritz, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Filed July 2, 1958, Ser. No. 746,107
11 Claims. (Cl. 260—47)

This invention is concerned with a process for the production of polycarbonates.

It is known to produce linear high molecular weight crystallisable thermoplastic, stretchable film- and fibre-forming polycarbonates from carbonic acid derivatives such as aliphatic, cycloaliphatic and aromatic diesters of carbonic acid, phosgene and bis-chlorocarbonic acid esters of organic dihydroxy compounds on the one hand, di-(monohydroxy-aryl)-alkanes or mixtures of di-(monohydroxy-aryl)-alkanes and aliphatic, cycloaliphatic and aromatic dihydroxy compounds or, in general, mixtures of at least one aliphatic or cycloaliphatic and at least one aromatic dihydroxy compound or di-(monohydroxy-aryl)-sulphones or mixtures of di-(monohydroxy-aryl)-sulphones with other di-functional hydroxy compounds on the other hand. Halogen-containing di-(monohydroxy-aryl)-alkanes have also been used as starting materials for the production of this type of polycarbonate. Polycarbonates produced therefrom with a sufficient halogen content are certainly only inflammable with difficulty or are non-inflammable but, nevertheless, usually do not possess above about 100° C. a good and lasting heat stability.

We have now found that polycarbonates with, to a certain extent, considerably improved properties in comparison with the known, and especially the halogen-containing, polycarbonates are obtained when there is used for their production halogen-containing di-(monohydroxy-aryl)-alkanes which, before their reaction with the carbonic acid derivatives, are subject to treatment with basic agents at elevated temperatures.

Suitable halogen-containing di-(monohydroxy-aryl)-alkanes for the invention are, for example, 4,4'-dihydroxy-3,3'-dichloro diphenyl methane, 4,4'-dihydroxy-3,3',5,5'-tetrachlorodiphenyl methane, 4,4'-dihydroxy-3,3',5,5'-tetrabromodiphenyl methane, 2,2-(4,4'-dihydroxy-3,3'-dichlorodiphenyl)-propane, 2,2-(4,4'-dihydroxy-3,3',5,5'-tetrachlorodiphenyl)-propane, 2,2-(4,4'-dihydroxy-3,3',5,5'-tetrabromodiphenyl)-propane and 1,1-(4,4'-dihydroxy-3,3',5,5'-tetrachlorodiphenyl)-cyclohexane.

Suitable basic agents for the prior treatment of the halogen-containing di-(monohydroxy-aryl)-alkanes are, for example, ammonia, alkali metal or alkaline earth metal hydroxides, alkali metal or alkaline earth metal carbonates, acetates or formates, and organic bases such as diethylamine, triethylamine, pyridine, dimethylaniline and triethylbenzene.

The treatment with these types of basic agents can, for example, so proceed that the crude, chlorine-containing dihydroxy compounds, which are obtained in the known manner by, for example, chlorination, are dissolved in an aqueous solution of sodium hydroxide and heated up to elevated temperatures from about 50° C. to the boiling point of the solution, or a suspension of the crude products is heated in dilute aqueous sodium carbonate solution to corresponding temperatures, or small amounts of such alkalis are added to distillable crude products before distillation.

Such a treatment causes aliphatically bound halogen which is still attached to the halogen-containing dihydroxy compounds from their production, to be split off. The polycarbonates produced from dihydroxy compounds which have been prior treated in this manner are characterised in that they contain only aromatically-bound halogen but do not contain aliphatically-bound halogen.

For the production of the new polycarbonates, the halogen-containing and basically after-treated di-(monohydroxy-aryl)-alkanes can be converted into high molecular weight polycarbonates alone or in admixture with halogen free aromatic and/or aliphatic and/or cycloaliphatic dihydroxy compounds by the processes mentioned above.

Among the other dihydroxy compounds which may be combined with the halogen-containing di-(monohydroxy-aryl)-alkanes we prefer halogen free di-(monohydroxy-aryl)-alkanes such as:

4,4'-dihydroxy-diphenyl-methane,
1,1-(4,4'-dihydroxy-diphenyl)-ethane,
1,1-(4,4'-dihydroxy-diphenyl)-propane,
1,1-(4,4'-dihydroxy-diphenyl)-butane,
1,1-(4,4'-dihydroxy-diphenyl)-2-methyl-propane,
1,1-(4,4'-dihydroxy-diphenyl)-heptane,
1,1-(4,4'-dihydroxy-diphenyl)-1-phenyl-methane,
(4,4'-dihydroxy-diphenyl)-(4-methyl-phenyl)-methane,
(4,4'-dihydroxy-diphenyl)-(4-ethyl-phenyl)-methane,
(4,4'-dihydroxy-diphenyl)-(4-isopropyl-phenyl)-methane,
(4,4'-dihydroxy-diphenyl)-(4-butyl-phenyl)-methane,
(4,4'-dihydroxy-diphenyl)-benzyl-methane,
(4,4'-dihydroxy-diphenyl)-α-furyl-methane,
2,2-(4,4'-dihydroxy-diphenyl)-propane,
2,2-(4,4'-dihydroxy-diphenyl)-butane,
2,2-(4,4'-dihydroxy-diphenyl)-pentane (melting point 149–150° C.),
2,2-(4,4'-dihydroxy-diphenyl)-4-methyl-pentane,
2,2-(4,4'-dihydroxy-diphenyl)-heptane (boiling point 198–200° C. under 0.3 mms. mercury gauge),
2,2-(4,4'-dihydroxy-diphenyl)-octane,
2,2 - (4,4' - dihydroxy-diphenyl)-nonane (melting point 68° C.),
1,1-(4,4'-dihydroxy-diphenyl)-1-phenyl-ethane,
1,1-(4,4'-dihydroxy-diphenyl)-1-(α-furyl)-ethane,
3,3-(4,4'-dihydroxy-diphenyl)-pentane,
4,4-(4,4'-dihydroxy-diphenyl)-heptane,
1,1-(4,4'-dihydroxy-diphenyl)-cyclopentane,
1,1-(4,4'-dihydroxy-diphenyl)-cyclohexane,
2,2 - (4,4' - dihydroxy - diphenyl) - decahydronaphthalene (melting point 181° C.),
2,2 - (4,4' - dihydroxy - 3,3' - dicyclohexyl - diphenyl)-propane (melting point 144–146° C.),
2,2-(4,4'-dihydroxy-3-methyl-diphenyl)-propane (melting point 114° C.),
2,2-(4,4'-dihydroxy-3-isopropyl-diphenyl)-butane,
1,1-(4,4'-dihydroxy-3,3'-dimethyl-diphenyl)-cyclohexane,
2,2-(4,4'-dihydroxy-3,3'-dibutyl-diphenyl)-propane,
2,2-(4,4'-dihydroxy-3,3'-diphenyl-diphenyl)-propane,
2,2-(4,4'-dihydroxy-2,2'-dimethyl-diphenyl)-propane,
1,1 - (4,4' - dihydroxy - 3,3' - dimethyl - 6,6' - dibutyl-diphenyl)-butane,
1,1-(4,4'-dihydroxy-3,3'-dimethyl-6,6'-di-tert.butyl-diphenyl)-ethane,
1,1-(4,4'-dihydroxy-3,3'-dimethyl-6,6'-di-tert.butyl-diphenyl)-propane,
1,1-(4,4'-dihydroxy-3,3'-dimethyl-6,6'-di-tert.butyldiphenyl)-butane,
1,1-(4,4'-dihydroxy-3,3'-dimethyl-6,6'-di-tert.butyldiphenyl)-isobutane,
1,1-(4,4'-dihydroxy-3,3'-dimethyl-6,6'-di-tert.butyl-diphenyl)-heptane,
1,1-(4,4'-dihydroxy-3,3'-dimethyl-6,6'-di-tert.butyl-diphenyl)-1-phenyl-methane,
1,1-(4,4'-dihydroxy-3,3'-dimethyl-6,6'-di-tert.butyl-diphenyl)-2-methyl-2-pentane,
1,1-(4,4'-dihydroxy-3,3'-dimethyl-6,6'-di-tert.butyl-diphenyl)-2-ethyl-2-hexane, and 1,1-(4,4'-dihydroxy-3,3'-dimethyl-6,6'-di-tert.amyl-diphenyl)-butane.

As examples of other accompanying dihydroxy compounds which may be used according to the invention, the following are named—

Aliphatic dihydroxy compounds such as:

Ethylene glycol, diethylene glycol, triethylene glycol, polyethylene glycol, thiodiglycol, ethylene dithiodiglycol, the di-, and polyglycols produced from propyleneoxide-1, 2, o, m, or p-xylene glycol, propanediol-1,3, butanediol-1,3, butanediol-1,4, 2-methylpropanediol-1,3, pentanediol-1,5, 2-ethylpropanediol-1,3, hexanediol-1,6, octanediol-1,8, 1-ethylhexanediol-1,3, and decanediol-1,10.

Cycloaliphatic dihydroxy compounds such as:

Cyclohexanediol-1,4, cyclohexanediol-1,2, 2,2-(4,4'-dihydroxy-dicyclohexylene)-propane and 2,6-dihydroxy-decahydronaphthalene, and Aromatic dihydroxy compounds such as:

Hydroquinone, resorcinol, pyrocatechol, 4,4'-dihydroxydiphenyl, 2,2'-dihydroxydiphenyl, 1,4-dihydroxynaphthalene, 1,6 - dihydroxynaphthalene, 2,6 - dihydroxynaphthalene, 1,2-dihydroxynaphthalene, 1,5-dihydroxynaphthalene, dihydroxyanthracene, 2,2' - dihydroxydinaphthyl-1,1', and o, m, or p-hydroxybenzylalcohol.

The new polycarbonates can be produced in the same way as the known polycarbonates, that is to say: halogen-containing di-(monohydroxy-aryl)-alkanes of the kind mentioned above or mixtures thereof with halogen free dihydroxy compounds of the type mentioned above can be reacted with derivatives of carbonic acid selected from the group consisting of carbonic diesters, especially diarylesters, phosgene and bis-chlorocarbonic acid esters of hihydroxy compounds.

Thus the dihydroxy compounds can be re-esterified with carbonic acid diesters, e.g. with the dimethyl-, diethyl-, dipropyl-, dibutyl-, diamyl-, dioctyl-, dicyclohexyl-, and especially with the diphenyl- and di-o, m, or p-toluyl-carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o, m, or p-toluyl and the cyclohexyl-phenyl carbonate particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

As diesters of carbonic acid there may also be used dialkyl-, dicycloalkyl-, or diaryl dicarbonates of aromatic dihydroxy compounds especially of halogen-containing di-(monohydroxy-aryl)-alkanes or/and of halogen free di-(monohydroxy-aryl)-alkanes of the kind mentioned above.

Suitable bis-diesters of carbonic acid of this kind are for instance: bis-alkyl, e.g. bis-ethyl, bis-propyl, bis-isopropyl, bis-butyl, bis-amyl, bis-hexyl, bis-cycloalkyl, e.g. bis-cyclohexyl and bis-methylcyclohexyl, and bis-aryl, e.g. bis-phenyl, bis-cresyl, bis-cyclohexylphenyl and bis-naphthyl carbonates of resorcinol, hydroquinone, 2,4-dioxytoluene, 2,5-dioxytoluene, 3,5-dioxytoluene, 4,4'-dioxydiphenyl, 2,4'-dioxydiphenyl, 4,4'-dioxy-3-cyclohexyldiphenyl, 1,4-dioxynaphthlene, 1,6-dioxynaphthalene, 2,6-dioxynaphthalene, 1,5-dioxyanthracene and of di-(mono-oxyaryl)-alkanes, in particular of halogen-containing ones as described above.

When reesterifying such bis-diesters of carbonic acid with dihydroxy compounds the corresponding monohydroxy compound, which was originally a component of the bis-diester, is split off.

On the other hand it is also possible to heat such bis-diesters of carbonic acid alone. In this case separation of corresponding neutral alkyl, cycloalkyl, or aryl carbonates takes place while the corresponding polycarbonate is formed.

The re-esterifying process has to be conducted while excluding oxygen. We prefer to pass an inert-gas such as hydrogen, nitrogen, or carbon dioxide gas through the melt.

The re-esterifications may be activated by re-esterifying catalysts, such as inorganic bases, for example caustic soda and potassium hydroxide, high boiling organic bases, such as acridine, metal hydrides such as lithium and calcium hydride, alkali or alkaline earth metals such as sodium, potassium, magnesium, and calcium, metal oxides such as zinc oxide, aluminium oxide, lead oxide, antimonotrioxide, cerium oxide, and boron oxide, acids such as phosphoric acid and p-toluene sulphonic acid, and salts such as sodium benzoate, calcium acetate, and boron phosphate, and alcoholates and phenolates.

The polycarbonates can also be produced by introducing phosgene into solutions of the aforesaid dihydroxy compounds in organic bases, such as dimethylaniline, diethylaniline, trimethylamine, and pyridine, or in indifferent organic solvents, such as petrol, ligroin, cyclohexane, methylcyclohexane, benzene, toluene, xylene, chloroform, methylenechloride, carbon tetrachloride, trichloroethylene, di-chloroethylene, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts such as lithium, sodium, potassium, and calcium salts of the dihydroxy compounds, preferably in the presence of an excess of a base such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable eof dissolving phosgene and eventually the produced polycarbonate.

The phosgene may be used in an equivalent amount. Generally, however, it is preferable to use an excess of the phosgene. Suitable temperatures are from about 0° C. to about 100° C.

Finally it is also possible to react bis-chloro-carbonates of halogen-containing di-(monohydroxy-aryl)-alkanes of the kind mentioned above, with said halogen containing di-(monohydroxy-aryl)-alkanes or with other aforementioned dihydroxy compounds, or by reacting said halogen containing di - (monohydroxy - aryl) - alkanes with bis-chlorocarbonates of the aforementioned other dihydroxy compounds. The condensation proceeds in the presence of inert solvents, and acid-binding materials, e.g. tertiary amines.

When using phosgene or bis-chlorocarbonic acid esters as derivatives of the carbonic acid in producing polycarbonates according to the invention catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethylammoniumhydroxide, triethyloctadecylammoniumchloride, trimethylbenzylammoniumfluoride, triethyl-benzyl ammoniumchloride, dimethyl-dodecylammoniumchloride, dimethylbenzyl - phenylammoniumchloride, trimethylcyclohexylammoniumbromide, and N - methylpyridiniumchloride, in amounts from about 0.05 to about 5 percent by weight. These compounds may be added to the reaction mixture before or during the reaction.

Further in some of these cases we prefer to add surface-active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

By adding monofunctional compounds which are capable of reacting with phosgene or with the end groups to the polycarbonates consisting of the chlorocarbonic acid ester group and which terminate the chains, such as the phenols, for instance, the phenol, the tert.butpylphenyl, the cyclohexylphenyl, and 2,2-(4,4'-hydroxyphenyl-4,4'-methoxyphenyl)propane further aniline and methylaniline, it is possible to regulate the molecular weight of the polycarbonates in wide limits.

Along with the above non-inflammability or flame repellency, the new polycarbonates surprisingly possess some improved physical properties such as, for example, increased tensile strength, an exceptionally high transition point of the second order, reduced permeability to steam and increased electric insulation and surface resistance.

These properties are the more distinct the higher the halogen content is in the new polycarbonates. As a rule one can say that the poducts should have at least about 5 percent halogen, while the upper limit for the halogen content lies at about 65 percent.

Therefore when using mixtures of halogen containing di-(monohydroxy-aryl)-alkanes with halogen free dihydroxy compounds for the production of the new polycarbonates the amounts of halogen-containing and halogen-free starting materials should be chosen in such a manner that the halogen content of the end product ranges within the limits mentioned above.

The new polycarbonates can be used in the form of films, fibres, pressed and injection moulded bodies, lacquers and coatings with advantage in all cases where, together with non-inflammability, favourable mechanical and/or electrical properties and high thermal stability are of importance as, for example, in the textile industry, in the electrical industry and in the construction of ships.

The following examples are given for the purpose of illustrating the invention:

*Example 1*

Into a mixture of 89.3 parts by weight 2,2-(4,4'-dihydroxy-3,3',5,5' - tetrachlorodiphenyl) - propane (1 mol), which have been previously treated with sodium hydroxide solution and triethylamine at 80° C. for 1 hour, 165 parts by weight methylene chloride, 550 parts by weight water and 45 parts by weight 45 percent sodium hydroxide solution are introduced with stirring at 25° C. in 90 minutes 35.8 parts by weight gaseous phosgene (1.5 mol) and simultaneously a further 75 parts by weight 45 percent sodium hydroxide are added dropwise so that the pH value of the reaction mixture lies between 13 and 14. 0.12 part by weight triethylamine and 1 part by weight of a wetting agent are then added whereby the temperature increases to about 29° C. without further cooling. After about 2½ hours the methylene chloride solution of the polycarbonate formed becomes highly viscous. It is washed free of electrolytes in a kneader. After evaporation of solvent and water, a flame repellent hard, elastic, high molecular weight plastic remains behind.

While a polycarbonate produced correspondingly from 2,2-(4,4'-dihydroxy-3,3',5,5'-tetra-chloro-diphenyl) - propane which has not been previously treated with sodium hydroxide solution and triethylamine, decomposes on melting, the present polycarbonate has a good heat stability.

A comparison of the present polycarbonate with a such one produced in a corresponding manner, but by using 2,2-4,4'-dihydroxy-diphenyl)-propane instead of 2,2-(4,4'-dihydroxy-3,3'-5,5' - tetrachloro - diphenyl)propane pretreated as described above, shows that the tensile strength increases from 855 to 1079 per kg./cm.$^{-2}$, the second order transistion point from 144° C. to 180° C., the insulating resistance at 20° C. from $7\times10^{16}$ to $4.3\times10^{17}$ Ωcm.$^{-1}$, the surface resistance at 80% relative humidity from 1.9×10$^{14}$ to 3.8×10$^{15}$ Ωcm.$^{-1}$, while the water vapor permeability at 20° C. decreases from 4.0×10$^{-8}$ to 2.1×10$^{-8}$ gr. cm.$^{-1}$.h.$^{-1}$ mm.. mercury gauge$^{-1}$.

*Example 2*

Into a mixture of 76.8 parts by weight 2,2-(4,4-dihydroxy-3,3'-dichlorodiphenyl)-propane (1 mol), which have previously been treated treated with sodium hydroxide solution and a little triethylamine at 80° C. for 1 hour, 165 parts by weight methylene chloride, 330 parts by weight water and 30 parts by weight 45 percent sodium hydroxide solution, there are passed with stirring at 25° C. in 100 minutes 35.8 parts by weight phosgene (1.5 mol), and a further 44 parts by weight 45 percent sodium hydroxide solution are simultaneously added dropwise (pH value 13 to 13). Subsequently, 0.12 part by weight triethylamine and 1 part by weight of a wetting agent are added. After about one hour the methylene chloride solution of the polycarbonate formed becomes highly viscous. It is washed free of electrolytes in a kneader. After evaporation of solvent and water an elastic high molecular weight plastic remains behind. Softening point 185–195° C., second order transition point 149° C. It dissolves, for example, in methylene chloride, chloroform, benzene, toluene, dioxane and dimethyl formamide and can be worked up via a melt or solution to give formed objects which are flame repellent, i.e. which coke in gas flames with a weak flame formation but which, however, extinguish immediately after removal of the flame.

*Example 3*

Into a mixture of 105 parts by weight of 1,1-(4,4'-dihydroxy - 3,3',5,5' - tetrachlorodiphenyl) - cyclohexane (1 mol), which have boiled for half an hour with approximately 2 percent sodium carbonate solution, 165 parts by weight methylene chloride, 550 parts by weight water and 30 parts by weight 45 percent sodium hydroxide solution, are passed in with stirring at 25° C. in 115 minutes 35.8 parts by weight phosgene (1.4 mol), 56 parts by weight 45 percent sodium hydroxide solution being simultaneously added dropwise (pH value 13–14). Subsequently, 0.12 part by weight triethylamine and 1 part by weight of a wetting agent are added whereby the temperature increases by a few degrees. After about 5 hours, the methylene chloride solution of the polycarbonate formed becomes highly viscous. After washing it free of electrolytes, the solvent and water are evaporated off. The remaining elastic, high molecular weight plastic shows a softening point of 230 to 240° C. and a second order transition point of 173° C. It can be worked up, by way of a melt or solution to formed bodies which are flame repellent.

*Example 4*

Into a mixture of 66.2 parts by weight 2,2-(4,4'-dihydroxy - 3,3'-5,5' - tetrachlorodiphenyl) - propane (0.7 mol), which have been distilled with the addition of calcium acetate, 26.2 parts by weight 4,4'-dihydroxy-3,3,5,5'-tetrachlorodiphenyl-methane (0.3 mol), which have been treated at 80° C. for one hour with sodium hydroxide solution and triethylamine, 165 parts by weight methylene chloride, 750 parts by weight water and 30 parts by weight 45 percent sodium hydroxide solution, there are passed in at 25° C. with stirring in 110 minute 35.8 parts by weight phosgene, 48 parts by weight 45 percent sodium hydroxide solution being simultaneously added dropwise (pH value 13–14). 0.12 part by weight triethylamine and one part by weight of a wetting agent are subsequently added. After about 3 hours the methylene chloride solution of the polycarbonate formed becomes highly viscous. It is washed free of electrolytes in a kneader. After evaporation of solvent and water, a hard, elastic, high molecular weight plastic remains behind. Softening point 180–190° C. It can be worked up, by way of a melt or solution, to formed bodies which are flame repellent.

Example 5

Into a mixture of 51 parts by weight 4,4'-dihydroxy-3,3',5,5'-tetrachlorodiphenylmethane (0.5 mol), which have treated with sodium hydroxide solution and triethylamine at 80° C. for one hour, 34.4 parts by weight 2,2-4,4'-dihydroxy-diphenyl)-propane (0.5 mol), 165 parts by weight methylene chloride, 750 parts by weight water and 30 parts by weight 45 percent sodium hydroxide solution, are passed in at 25° C. with stirring in 115 minutes 35.8 parts by weight phosgene (1.5 mol), 48 parts by weight 45 percent sodium hydroxide solution being simultaneously added dropwise so that the pH value lies at about 12 until the end of the reaction. 0.12 part by weight triethylamine and one part by weight of a wetting agent are then added. After about 5 hours, the methylene chloride solution of polycarbonate formed is viscous. It is washed free of electrolytes, and water and solvent are distilled off. A hard, elastic, high molecular weight plastic remains behind.

Example 6

Into a mixture of 132.7 parts by weight 2,2-(4,4'-dihydroxy-3,3',5,5'-tetrabromodiphenyl)-propane (1 mol), which have been treated with sodium hydroxide solution and triethylamine at 80° C. for one hour, 165 parts by weight methylene chloride, 550 parts by weight water and 40 parts by weight 45 percent sodium hydroxide solution are passed in at 25° C. with stirring in two hours 35.8 parts by weight phosgene (1.5 mol), 59 parts by weight 45 percent sodium hydroxide solution being simultaneously added dropwise so that the pH value lies at about 13 until the end of the reaction. 0.12 part by weight triethylamine and 1 part by weight of a wetting agent are then added. After about 3½ hours, the methylene chloride solution of the polycarbonate is highly viscous. It is washed free of electrolytes, water and solvent are distilled off and a high molecular weight plastic is obtained. Softening interval 253–263° C., second order transition point 157° C. The product can be worked up, by way of a melt or solution, to flame repellent formed bodies.

Example 7

Into a mixture of 130.7 parts by weight 2,2-(4,4'-dihydroxy-diphenyl)-propane (0.95 mol) and 16.5 parts by weight 2,2-(4,4'-dihydroxy-3,3',5,5'-tetrabromodiphenyl)-propane (0.05 mol), which have been treated with sodium hydroxide solution and triethylamine at 80° C. for 1 hour, 330 parts by weight methylene chloride, 615 parts by weight water, 0.8 part by weight p-tert.-butylphenol and 156 parts by weight 45 percent sodium hydroxide solution, there are passed in at 25° C. with stirring in two hours 71.5 parts by weight phosgene. 0.24 part by weight triethylamine and 2 parts by weight of a wetting agent are added. After about 20 minutes, the methylene chloride solution of the polycarbonate is highly viscous. It is washed free of electrolytes, water and solvent are distilled off. Formed bodies produced from the so-obtained product via a melt or solution are flame repellent.

Example 8

18.3 parts by weight 2,2-(4,4'-dihydroxy-3,3',5,5'-tetrachlorodiphenyl)-propane, which have been distilled over calcium acetate, 18 parts by weight di-(2,6-dichlorophenyl)-carbonate and 0.1 part by weight disodium salt of 2,2-(4,4'-dihydroxydiphenyl)-propane are melted together with stirring and passing over of nitrogen. The greater part of the 2,6-dichlorophenol split off by reaction is distilled off at 200–220° C./50 mm. The pressure is then gradually reduced to 0.5 mm. and the melt, which becomes increasingly more viscous, is stirred for half an hour at 250° C., one hour at 270° C. and a further hour at 300° C. and 0.5 mm. pressure. Thus, there is obtained a highly viscous, clear, yellowish melt of a high molecular weight plastic.

Example 9

Into a solution of 22.83 parts by weight 2,2-(4,4'-dihydroxy-diphenyl)-propane in 32 parts by volume absolute pyridine and 120 parts by weight absolute methylene chloride there is dropped at 0° C. under stirring within 30 minutes a solution of 49.0 parts by weight 2,2-(4,4'-dihydroxy - 3,3',5,5' - tetrachlorodiphenyl) - propane-bis-chlorocarbonic acid ester (melting point 163–164° C.) in 120 parts by weight absolute methylene chloride. The 2,2-(4,4'-dihydroxy - 3,3',5,5' - tetrachlorodiphenyl)-propane-bis-chlorocarbonic acid ester was produced by reacting one mol of 2,2-(4,4'-dihydroxy-3,3',5,5'-tetrachlorodiphenyl)-propane, pretreated by boiling for three times with one percent sodium carbonate solution, with 2 mols of phosgene in a mixture of dimethyl aniline and benzene. After cooling over night to room temperature, 200 parts by volume 2 N hydrochloric acid are added to the reaction mixture. The organic layer is separated and washed two times with diluted hydrochloric acid and then with water free from electrolytes and dried over water-free sodium sulphate. After distilling off the solvent, there remains a tough transparent colourless plastic, soluble for instance in benzene, toluene, methylene chloride, chloroform, tetrahydrofurane, dimethyl formamide, cresol, and pyridine. It can be worked up to flame repellent formed bodies via a melt and solution.

According to these examples linear high molecular weight, stretchable film and fibre forming thermoplastic polycarbonates are obtained wherein the essential recurring unit is

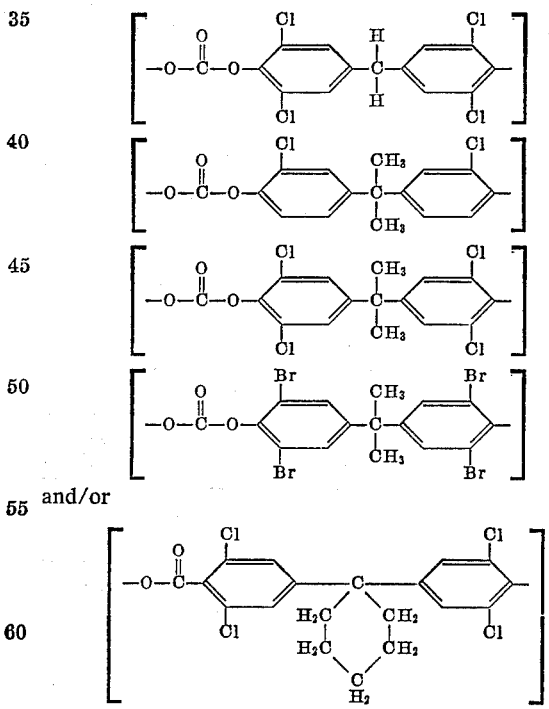

and/or

We claim:
1. In a process wherein a nuclearly halogenated di-(monohydroxyaryl)alkane of the formula:

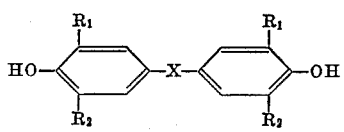

wherein $R_1$ and $R_2$ are each selected from the group consisting of hydrogen, chlorine and bromine, at least two of these substituents being halogens, and X is selected from the group consisting of:

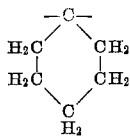

and

wherein $R_3$ and $R_4$ are selected from the group consisting of hydrogen and $CH_3$, said compound containing as an impurity aliphatically bound halogen, is reacted with a carbonic acid derivative selected from the group consisting of phosgene, carbonic acid diesters, and chlorocarbonic acid esters of di-(monohydroxyaryl)alkanes to form a linear, high molecular weight, stretchable film- and fiber-forming thermoplastic resinous polycarbonate, the improvement comprising pretreating said nuclearly halogenated di-(monohydroxyaryl)alkane prior to its reaction with said carbonic acid derivative, with a base at a temperature of at least 50° C. to remove said aliphatically bound halogen therefrom, as a result of which the polycarbonate when formed is stable at its melting point.

2. The combination of claim 1 in which the amount of halogenated alkane esterified is such that the resin contains from about 5 to about 65 percent halogen.

3. Process according to claim 1 wherein the nuclear-halogenated di-(monohydroxy-aryl)-alkane is 4,4'-dihydroxy-3,3',5,5'-tetrachlorodiphenyl-methane.

4. Process according to claim 1 wherein the nuclear-halogenated di-(monohydroxy-aryl)-alkane is 2,2-(4,4'-dihydroxy-3,3'-dichlorodiphenyl)-propane.

5. Process according to claim 1 wherein the nuclear-halogenated di-(monohydroxy-aryl)-alkane is 2,2-(4,4'-dihydroxy-3,3',5,5'-tetrachlorodiphenyl)-propane.

6. Process according to claim 1 wherein the nuclear-halogenated di-(monohydroxy-aryl)-alkane is 2,2-(4,4'-dihydroxy-3,3',5,5'-tetrabromodiphenyl)-propane.

7. Process according to claim 1 wherein the nuclear-halogenated di-(monohydroxy-aryl)-alkane is 1,1-(4,4'-dihydroxy-3,3',5,5'-tetrachlorodiphenyl)-cyclohexane.

8. Process according to claim 1 wherein the alkali is selected from the group consisting of ammonia, alkali metal and alkaline earth metal hydroxide, carbonate, acetate and formate, and organic tertiary amines.

9. Process according to claim 1 wherein the alkali is triethylamine.

10. Process according to claim 1 wherein the treatment with alkali is carried out in an aqueous solution.

11. Process according to claim 1 wherein the treatment with alkali is carried out by distilling the halogenated di-(monohydroxy-aryl)-alkanes in contact with the the alkali.

References Cited in the file of this patent

UNITED STATES PATENTS

| | | |
|---|---|---|
| 2,455,652 | Bralley | Dec. 7, 1948 |
| 2,811,566 | Bader | Oct. 29, 1957 |
| 2,829,175 | Bowman | Apr. 1, 1958 |

FOREIGN PATENTS

| | | |
|---|---|---|
| 772,627 | Great Britain | Apr. 17, 1957 |